(12) United States Patent
Kim et al.

(10) Patent No.: US 9,696,483 B2
(45) Date of Patent: Jul. 4, 2017

(54) BACKLIGHT UNIT AND DISPLAY DEVICE INCLUDING THE SAME

(71) Applicant: LG Display Co., Ltd., Seoul (KR)

(72) Inventors: Eui-Jung Kim, Jecheon-si (KR); Ja-Kyung Goo, Dangjin-si (KR)

(73) Assignee: LG Display Co., Ltd., Seoul (KR)

( * ) Notice: Subject to any disclaimer, the term of this patent is extended or adjusted under 35 U.S.C. 154(b) by 32 days.

(21) Appl. No.: 14/586,356

(22) Filed: Dec. 30, 2014

(65) Prior Publication Data

US 2016/0047975 A1 Feb. 18, 2016

(30) Foreign Application Priority Data

Aug. 12, 2014 (KR) .................. 10-2014-0104486

(51) Int. Cl.
*F21V 7/04* (2006.01)
*F21V 8/00* (2006.01)

(52) U.S. Cl.
CPC ......... *G02B 6/0088* (2013.01); *G02B 6/0093* (2013.01)

(58) Field of Classification Search
CPC ... G02B 6/0088; G02B 6/0093; H05K 7/1417
USPC ..................... 362/634; 361/679.01
See application file for complete search history.

(56) References Cited

U.S. PATENT DOCUMENTS

| 2007/0064378 | A1 | 3/2007 | Lo et al. | |
|---|---|---|---|---|
| 2013/0308074 | A1* | 11/2013 | Park | G02B 6/0088 349/58 |
| 2014/0085779 | A1* | 3/2014 | Delva | G02F 1/133308 361/679.01 |

FOREIGN PATENT DOCUMENTS

| CN | 201611069 | 10/2010 |
|---|---|---|
| TW | 200702812 | 1/2007 |
| TW | 201314316 | 4/2013 |

OTHER PUBLICATIONS

Office Action for Taiwan Patent Application No. TW 10421253180, Sep. 16, 2015, 12 Pages.

* cited by examiner

*Primary Examiner* — Evan Dzierzynski
(74) *Attorney, Agent, or Firm* — Fenwick & West LLP (57) ABSTRACT

Disclosed are a backlight unit and a liquid crystal display device including the same to stably fix a light guide plate. The backlight unit includes a guide disposed between a cover bottom, on which a light guide plate is mounted, and the light guide plate, the guide having a plurality of projections in an area in which the guide contacts the light guide plate.

6 Claims, 5 Drawing Sheets

BACKLIGHT UNIT AND DISPLAY DEVICE INCLUDING THE SAME

CROSS-REFERENCE TO RELATED APPLICATION

This application claims the benefit of Korean Patent Application No. 10-2014-0104486, filed on Aug. 12, 2014, which is hereby incorporated by reference as if fully set forth herein.

BACKGROUND OF THE INVENTION

Field of the Invention

The present invention relates to a backlight unit and a display device including the same. More specifically, the present invention relates to a backlight unit and a display device including the same to stably fix a light guide plate.

Discussion of the Related Art

Flat display devices such as liquid crystal display devices and organic light emitting display devices are widely used due to advantages such as low driving voltage, slimness, and superior image quality.

Among the flat display devices, the liquid crystal display device includes a liquid crystal panel for controlling transmittance, a backlight unit disposed at the back or side surface of the liquid crystal panel for emitting light, and a case for accommodating the liquid crystal panel and the backlight unit. The case includes a cover bottom serving as a lower cover of the backlight unit. The backlight unit includes a light source, a light guide plate, a reflective sheet, and an optical sheet, which are accommodated in the cover bottom. In addition, the cover bottom is bonded to the liquid crystal panel by a front case paired with the cover bottom to form a liquid crystal module.

However, the liquid crystal display device has a white spot problem wherein light blurs in a partially damaged part of the light guide plate. The white spot is due to an increase in light scattering in a part of the light guide plate that results from scratches on a part of the light guide plate or the reflective sheet, or from breakage of beads formed on the light guide plate or the reflective sheet. The white spot causes deterioration in display quality of display devices.

For example, the liquid crystal display device generally utilizes an edge-type backlight unit in which a light source disposed on a side surface of the light guide plate is accommodated in the cover bottom in order to reduce the thickness of the display device. The edge-type backlight unit has a configuration in which a reflective sheet is staked on an inner surface of the cover bottom, a light guide plate is disposed on the reflective sheet, and a side surface of the light guide plate is surrounded by a side surface of the cover bottom. The side surface of the light guide plate, the side surface of the cover bottom, and the side surface of the light guide plate are spaced from one another by a predetermined distance in consideration of expansion and contraction of the light guide plate and are not in contact with one another.

The distance allows for displacement of the light guide plate in the cover bottom and thereby causes scratches on the surface of the light guide plate or the reflective sheet when physical force, such as an impact causing displacement of the light guide plate, is generated during use of the display device or transport of the display device.

SUMMARY OF THE INVENTION

Accordingly, the present invention is directed to a backlight unit and a display device including the same that substantially obviate one or more problems due to limitations and disadvantages of the related art.

In some embodiments, a backlight unit and a display device including the same stabilize a light guide plate.

Additional advantages, objects, and features of the invention's embodiments will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a guide disposed between a cover bottom, on which a light guide plate is mounted, and the light guide plate, wherein the guide has a plurality of projections in an area in which the guide contacts the light guide plate.

The projections may be formed on a surface of the guide facing a side surface of the light guide plate.

The guide may include a first support contacting a lower part of the light guide plate, and a second support vertically extending from the first support, the second support provided with the projections.

The projections may have a part connected to the first support.

A surface of the second support provided with the projections may face the side surface of the light guide plate, and the projections may extend from the second support toward the side surface of the light guide plate.

The guide may be disposed on at least one side surface of the light guide plate and may be disposed at an edge of a length direction of the side surface.

The guide may be disposed on a side surface of the light guide plate excluding a first side surface on which a light source is disposed, the first side surface among side surfaces of the light guide plate.

The cover bottom may have a mounting member on which the first support is mounted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION

Reference will now be made in detail to various embodiments of the present invention, examples of which are illustrated in the accompanying drawings. Wherever possible, the same reference numbers will be used throughout the drawings to refer to the same or like parts.

Various embodiments of the present invention are provided only for description in detail to an extent such that the embodiments may be easily executed by a person having common knowledge in the art to which the present invention belongs. It should be noted that identical elements are designated by the same reference numerals although they are shown in other drawings. A detailed description of well-known functions or configurations may be omitted when it is considered to obscure the subject matter of the present invention. Some features illustrated in the drawings are enlarged, reduced or simplified for better understanding and the drawings and components thereof are not necessarily illustrated at a proper ratio (magnification). However, those skilled in the art will easily understand these details.

Figure 1:
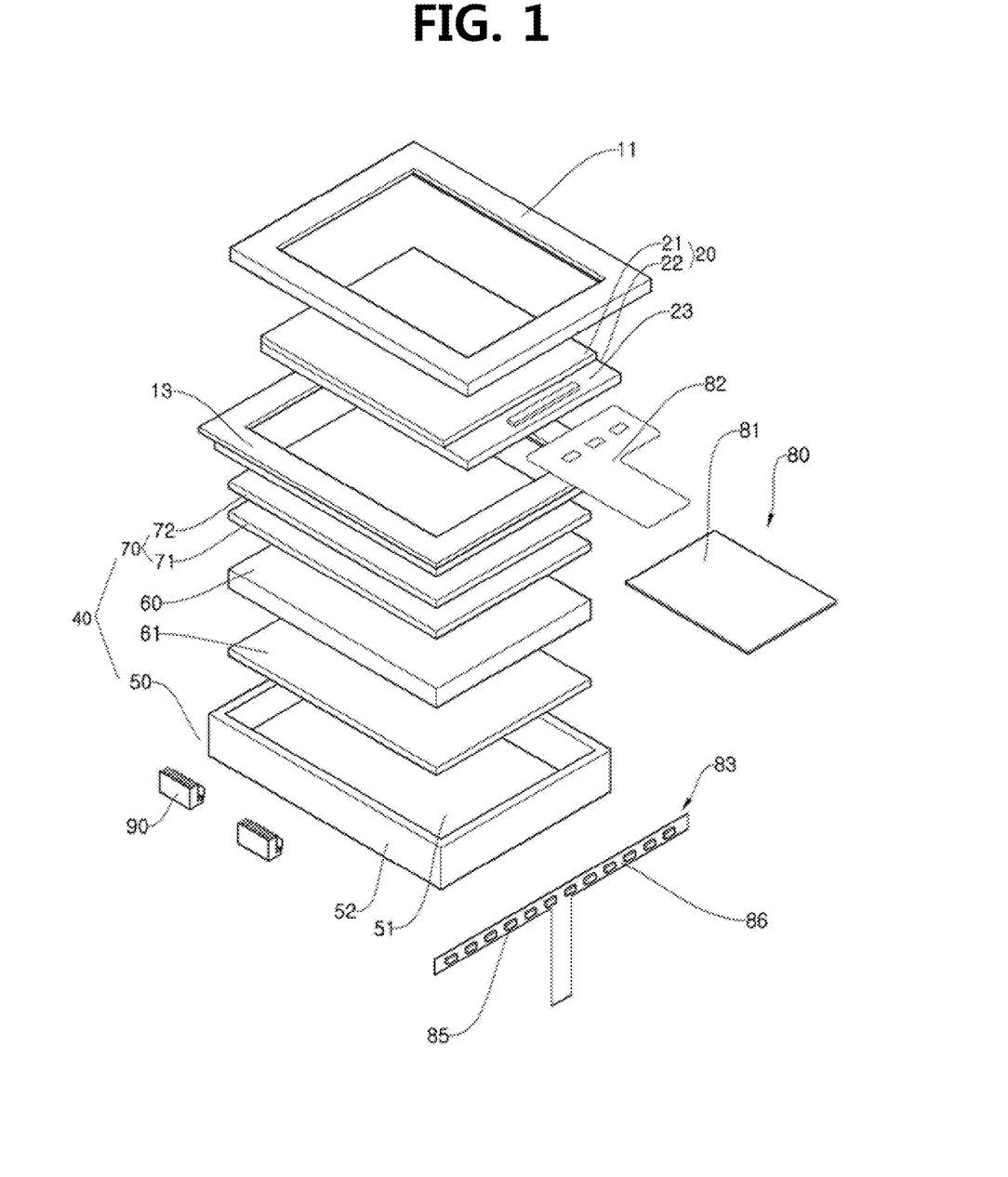
FIG. 1 is a perspective view illustrating an example of a display device according to one embodiment of the present invention.

FIG. 1 is a perspective view illustrating an example of a liquid crystal display device according to one embodiment of the present invention.

Referring to FIG. 1, the liquid crystal display device according to one embodiment includes an upper case 11, a display panel 20, a panel guide 13, a backlight unit 40, and a circuit unit 80. The backlight unit 40 includes a guide 90.

The upper case 11 is bonded to the panel guide 13 and a cover bottom 50 of the backlight unit 40 so that it accommodates and fixes the display panel 20, the backlight unit 40, and the circuit unit 80. For this purpose, the upper case 11 has a frame or picture frame shape such that a display area of the display panel 20 is exposed.

The display panel 20 is mounted on a surface of the panel guide 13 such that it is disposed on the backlight unit 40 and displays an image while controlling transmittance of light supplied from the backlight unit 40. For this purpose, the display panel 20 includes an upper substrate 21, a lower substrate 22 and liquid crystals (not shown) formed between the upper substrate 21 and the lower substrate 22.

The upper substrate 21 is provided with blue, green, and red color filters, black matrixes, and a common electrode.

The lower substrate 22 is provided with a plurality of thin film transistors respectively formed in cell regions defined by data lines and gate lines and a plurality of pixel electrodes respectively connected to the thin film transistors. The thin film transistors supply a data signal supplied from the data lines to a pixel in response to a gate signal supplied from the gate lines. The color filters, the thin film transistors, and the common electrode provided in the upper substrate may be formed on the lower substrate 22, but the configuration described above is not intended to limit the present invention. In addition, a pad member 23 for connecting the data lines and the gate lines may be provided in a non-display area of the lower substrate 22. The pad member 23 may be formed by extending the gate lines and the data lines formed in the upper and lower substrates 21 and 22 and the extended lines may be connected to the circuit substrate 81 by a flexible circuit 82 of the circuit unit 80. The flexible circuit 82 may be a tape carrier package or a chip on film (COF) and may include a data driving circuit for supplying an image signal to the data lines and a gate driving circuit for supplying a driving signal to the gate lines, or a flexible flat cable for electrically connecting the pad member 23 to the circuit substrate 80. The data driving circuit may be formed together with the driving circuit of the display panel 20 in a gate in panel (GIP) manner in the pad member 23 and the data driving circuit may be formed in a chip-on-panel (COP) or chip-on-glass (COG) manner and the present invention is not limited to that suggested above. The pad member 23 is formed in a region where one of the upper and lower substrates 21 and 22 is wider than the other in the display panel 20, or in a region where the upper and lower substrates 21 and 22 are bonded to each other while forming a step and do not overlap. The pad member 23 may be formed along two or more sides of the display panel 20, but an example in which the pad member 23 is formed along a side thereof is shown in FIG. 1.

The panel guide 13 connects the display panel 20 to the backlight unit 40 and fixes the display panel 20 and the backlight unit 40 while maintaining a predetermined distance therebetween. The panel guide 13 is formed to have a frame shape so as to supply light from the backlight unit 40 to the display panel 20.

The backlight unit 40 is disposed under the display panel 20 via the panel guide 13, and produces light, which is supplied to the display panel 20. For this purpose, the backlight unit 40 includes a cover bottom 50, a light guide plate 60, a reflective sheet 61, an optical sheet 70, a light source, and a guide 90. In particular, the guide 90 is disposed between the cover bottom 50, on which the light guide plate 60 is mounted, and the light guide plate 60, and includes a plurality of projections in a region where the guide 90 contacts the light guide plate 60. The guide 90 will be described in detail later.

The cover bottom 50 includes a wall body 52 which extends from an edge of the bottom surface 51. The cover bottom 50 accommodates and fixes the light source 83, the light guide plate 60, the reflective sheet 61 and the optical sheet 70 in a region provided between the bottom surface 51 and the wall body 52. In particular, for fixing the light guide plate 60 and the reflective sheet 61, the guide 90 is bonded between the light guide plate 60 and the cover bottom 50.

The light source 83 includes one or more light source elements 85 mounted on the light source circuit substrate 86. According to the illustrated embodiment, the backlight unit 40 is implemented as an edge type backlight unit wherein the light source 83 utilizes a light emitting diode (LED) as the light source element 85, but the present invention is not limited to this configuration.

The diffusion sheet 71 functions to prevent light emitted through the light guide plate 60 from being concentrated in certain areas and to uniformly distribute the light in the display panel 20. The diffusion sheet 71 may be disposed in regions requiring light distribution, such as regions between the light collection sheet 72 and the display panel 20, and regions between the light collection sheet 72 and the light guide plate 60. The diffusion sheet 71 diffuses light collected by the light collection sheet 72 or the light guide plate 60 to prevent a reduction in the viewing angle of the display panel 20 and to uniformly transfer the light to the display panel 20. In addition, the diffusion sheet 71 may be omitted, but the present invention is not limited thereto. An example in which the diffusion sheet 71 is disposed between the display panel 20 and the light collection sheet 72 is illustrated according to one embodiment, but the present invention is not limited thereto.

The light collection sheet 72 collects light from the light guide plate 60 and vertically transfers the light to the display panel 20. For this purpose, the light collection sheet 72 has a pattern enabling collection of light on at least one of an upper surface of the light collection sheet 72 facing the display panel 20 and on a lower surface of the light collection sheet 72 facing the light guide plate 60. In particular, the light collection sheet 72 of the illustrated embodiment may be a reverse prism sheet having a pattern formed on the surface of the light collection sheet 72 facing the light guide plate 60, but the present invention is not limited thereto. In addition, the diffusion sheet 71 may be interposed between the light collection sheet 72 and the display panel 20, or the light collection sheet 72 may include two or more light collection sheets.

The reflective sheet 61 is disposed in the lower part and the side surface of the light guide plate 60 to reflect light emitted to surfaces of the light guide plate 60 excluding a light-emitting surface thereof into the light guide plate 60. A plurality of prisms or beads may be formed on a surface of the reflective sheet 61 facing the light guide plate 60.

The light guide plate 60 guides light supplied from the light source 83 and emits light in one direction by internal diffusion so as to uniformly transfer the light to the display panel 20. The light guide plate 60 is accommodated in the cover bottom 50 and, in particular, is fixed in the cover bottom 50 by the guide 90.

The circuit unit 80 supplies a driving signal to the display panel 20, and supplies a signal and a voltage for driving the light source 83. For this purpose, the circuit unit 80 includes a circuit substrate 81 provided with a power supply and a signal generator, and one or more flexible circuits 82 for connecting the circuit substrate 81, the display panel 20, or the circuit substrate 81 to the light source. The flexible circuit 82 connects the circuit substrate 81 to the display panel 20 and thereby transfers signals such as a data signal, a gate signal, a timing control signal and an image signal.

Figure 2:
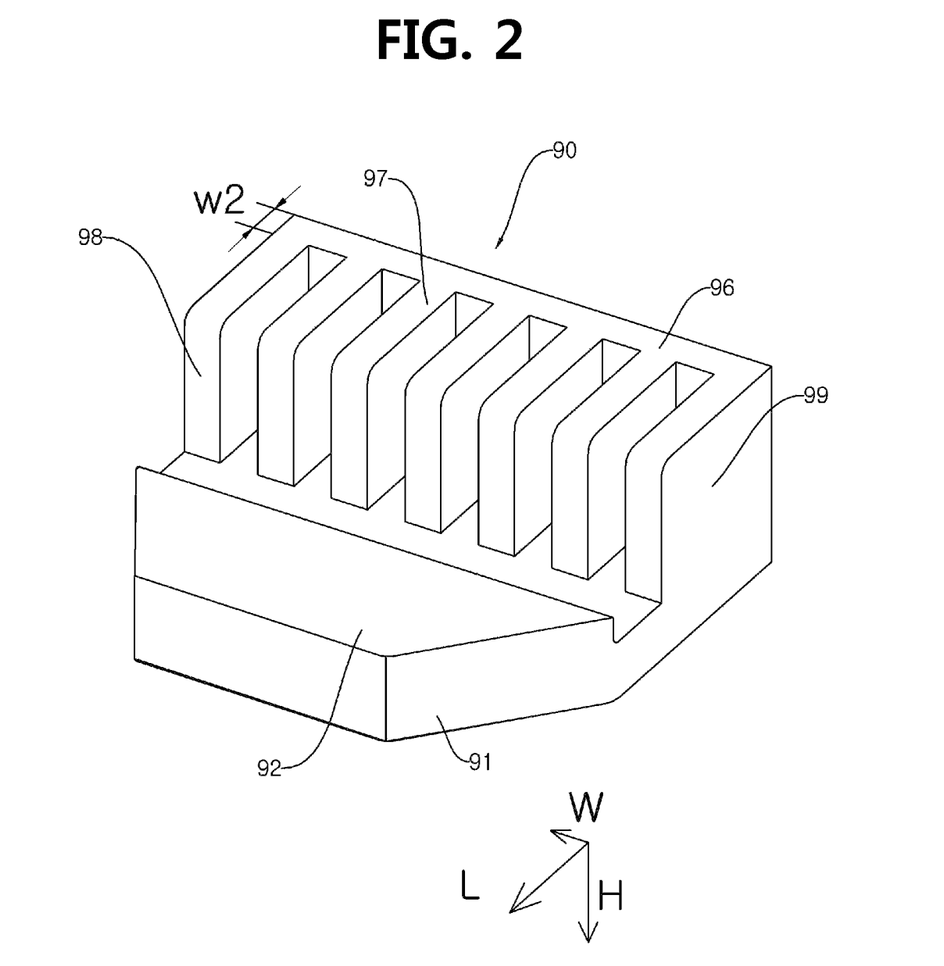
FIG. 2 is a front perspective view illustrating the guide.

FIG. 2 is a front perspective view illustrating the guide 90.

Referring to FIG. 2, the guide according to one embodiment includes a first support 91, a second support 96, and a plurality of projections 97.

The first support 91 contacts the lower part of the light guide plate 60 and supports the light guide plate 60. A reflective sheet 61 may be interposed between the light guide plate 60 and the first support 91, but the present invention is not limited thereto. In the illustrated embodiment, the first support 91 contacts the lower part of the light guide plate 60 and supports the light guide plate 60. Furthermore, the first support 91 includes a protrusion 92 having a thick part, but the present invention is not limited to this configuration and any configuration of the first support 91 is possible so long as it contacts the lower part of the light guide plate 60.

The second support 96 extends from an edge of a side of the first support 91 in a direction vertical to the first support 91. In particular, the second support 96 is provided with the projections 97 extending from the second support 96. The projections 97 extend in the direction vertical to the second support 96 and the first support 91. In other words, the projections 97 protrude from the second support 96 in a direction of the side surface of the light guide plate 60, that is, toward the first support 91.

As shown in the drawing, a plurality of projections is provided, and the projections may be spaced from one another by a uniform or non-uniform distance. The projections 97 have an end 98 contacting the side surface of the light guide plate 60 when the guide 90 is bonded between the cover bottom 50 and the light guide plate 60. In a state in which the light guide plate 60 does not expand, the projections 97 fix the light guide plate 60 so as to prevent the light guide plate 60 from moving in a longitudinal or transverse direction in the cover bottom 50. In addition, in a state in which the light guide plate 60 is expanded by heat generated in the light source 83, the projections 97 are folded to stably expand the light guide plate 60 and stably support the same.

Figure 3A:
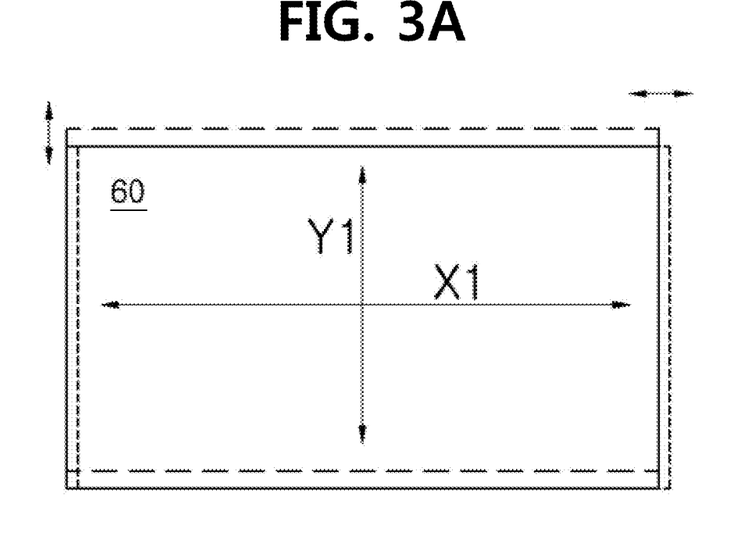
FIGS. 3A and 3B are example views illustrating displacement and expansion of the light guide plate.

For this purpose, when directions W, L, and H represented by the arrows of FIG. 3A are defined as width, length, and height, respectively, the length L and the width W are greater than the height H, and the height H is the same as the thickness of the light guide plate 60. For example, a ratio of the width W of the projection to the length L of projection to the thickness W2 of the second support 96 may be 1:2:1, but the present invention is not limited thereto. The ratio of the length L of the projection to the width W of the projection may be changed according to factors such as number of projections, size of the light guide plates 60 to be fixed, and the thermal expansion coefficient of the light guide plate 60.

In addition, the number of the projections 97 may be freely determined so long as the projections 97 are not deformed by a pressure applied by the light guide plate 60 in a transverse or longitudinal direction, that is, in a direction horizontal to the projection surface 99 or in the direction of length L of the projection 97.

The lower parts of the projections 97 may be disconnected from the first support 91, or may be partially or entirely bonded thereto.

Furthermore, the guide 90 may be formed using silicon (Si), or one or more elastic synthetic resins, but the present invention is not limited thereto.

Figure 3B:
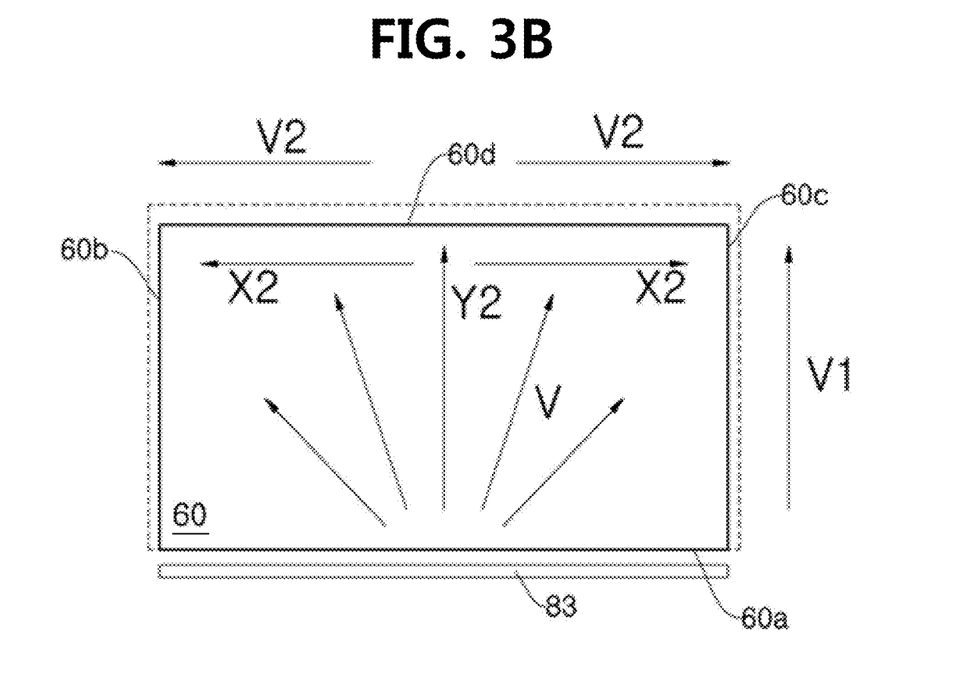

FIGS. 3A and 3B are example views illustrating displacement and expansion of the light guide plate.

Referring to FIGS. 3A and 3B, the light guide plate 60 is displaced in the cover bottom 50 by an external force. Specifically, the light guide plate 60 expands due to heat generated by the light source 83 and contracted when generation of heat ceases because the light source 83 stops operation. Due to expansion and contraction of the light guide plate 60, the cover bottom 50 is formed to be larger than the light guide plate 60 so that a predetermined distance is formed between the cover bottom 50 and the light guide plate 60.

The light guide plate 60 is displaced, independent of expansion and contraction, upon application of external force. The displacement proceeds in a transverse axis direction X1 or a longitudinal axis direction Y1 as shown in FIG. 3A, so that the light guide plate moves in a left-and-right direction (in the transverse axis direction X1) or in an up-and-down direction (in the longitudinal axis direction Y1).

Upon such displacement, friction is generated between the light guide plate 60 and the reflective sheet 61 and between the reflective sheet 61 and the cover bottom 50, and damage, such as a scratch, is generated on the reflective sheet 61 or the light guide plate 60, thus resulting in a problem, for example, deterioration in display quality. To prevent this damage, displacement of the light guide plate 60 by exterior force is prevented.

As described above, when the light source 83 operates to supply light, heat is transferred from the light source 83 to the light guide plate 60, which expands due to the heat. The expansion of the light guide plate 60 proceeds in a direction away from the light source 83.

More specifically, regarding the transverse axis direction, expansion proceeds from the center of the transverse axis of the light guide plate 60 to the left and right of transverse axis directions X2, and regarding the longitudinal axis direction, expansion proceeds from a side facing the light source 83 along a vertical direction Y2. Consequently, based on the left-and-right horizontal axis directions X2 and the vertical direction Y2 of the longitudinal axis, expansion proceeds from the light source 83 along a radial direction V.

When seen from respective side surfaces 60a to 60d of the light guide plate 60, at second and third side surfaces 60b and 60c vertical to the first side surface 60a facing the light source 83, expansion proceeds in the longitudinal axis direction, that is, the vertical direction Y2, or a first direction V1 parallel to the second and third side surfaces 60b and 60c. In addition, at a fourth side surface 60d parallel to the first side surface 60a, expansion proceeds from the center along a second direction V2 which corresponds to the direction of second and third side surfaces 60b and 60c while being parallel to the fourth side surface 60d.

Contraction proceeds in a direction opposite to expansion.

When the distance between the cover bottom 50 or the guide 90 bonded to the cover bottom 50 and the light guide plate 60 is increased in consideration of expansion of the light guide plate 60, potential displacement of the light guide plate 60 increases in a non-expansion state, and the variation in distance increases as well. When the distance between the guide or cover bottom 50 and the light guide plate 60 is maintained close in a contraction state in order to prevent displacement, the light guide plate 60 is disadvantageously deformed due to inhibition of natural expansion.

Accordingly, the illustrated embodiment supports the light guide plate 60 even upon expansion or contraction of the light guide plate 60 and enables natural expansion without deformation upon expansion by fixing and supporting the light guide plate 60 on the cover bottom 50 using the guide 90.

Figure 4A:
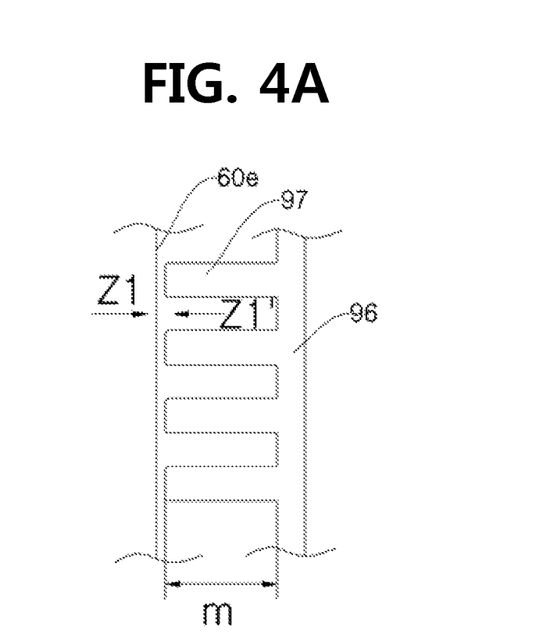
FIGS. 4A and 4B are example views illustrating support using the guide upon expansion and contraction of the light guide plate.
Figure 4B:
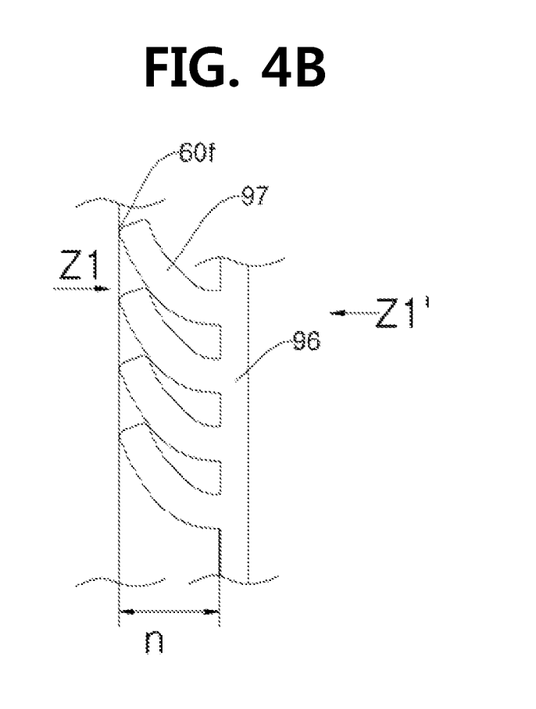

FIGS. 4A and 4B are an example views illustrating support using the guide 90 upon expansion and contraction of the light guide plate 60.

Referring to FIG. 4A, when the light guide plate 60 is contracted, pressure is applied in a direction parallel to a projection surface 99 (the directions of Z1 and Z1', direction L in FIG. 2) by displacement, the projections 97 disposed in a direction vertical to a side surface 60e of the light guide plate 60 maintain their shape and provide a repulsive force Z1' to the light guide plate 60 so as to prevent the light guide plate 60 from being displaced, and thereby fix the light guide plate 60 based on the repulsive force Z1'.

On the other hand, FIG. 4B shows when the light guide plate 60 is expanded by an expansion force Z having longitudinal (Z1) and transverse pressure, that is, a pressure is applied to the projections 97 in the longitudinal (Z1) direction, that is, a direction perpendicular to a side surface 60f of the light guide plate 60.

When the longitudinal (Z1) pressure is generated, the projections 97 having a length greater than a width and being made of an elastic material such as silicon (Si) are deformed and are folded in the direction in which the longitudinal (Z1) pressure is applied.

The folded projections 97 apply a transverse pressure to the side surface of the light guide plate 60 by the restoring force to support the light guide plate 60 and thereby prevent displacement of the expanded light guide plate 60. In addition, upon expansion of the light guide plate 60, as compared to FIG. 4A in which the projections 97 maintain the shape, in FIG. 4B, the projections 97 are folded so that the distance between the second support 96 and the side surface 60f of the light guide plate 60 is decreased (m>n). That is, when the light guide plate 60 expands, the projections 97 are folded without inhibiting the expansion, thus providing an area where the light guide plate 60 may expand and enabling natural expansion without deformation of the light guide plate 60.

Figure 5:
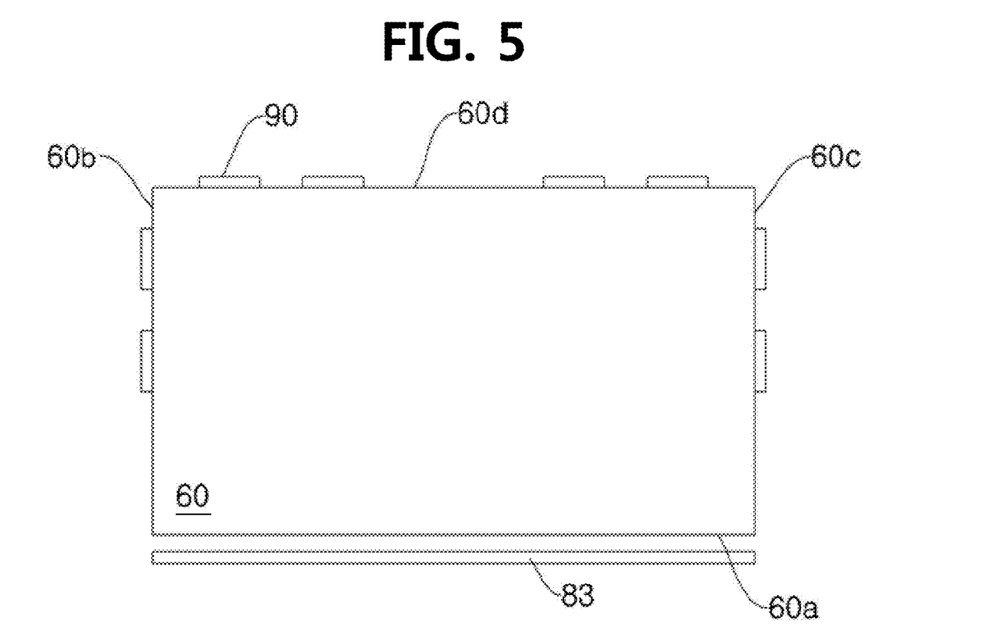
FIG. 5 is an example view illustrating disposition of the guide.

FIG. 5 is an example view illustrating disposition of the guide 90.

Referring to FIG. 5, the projections 97 are deformed by only expansion of the light guide plate 60 and disposition of the guide 90 is determined so as to make deformation easy upon expansion.

That is, as shown in FIG. 5, to transfer an expansion force of a direction vertical to the projection surface 99 to the projections 97, the guide 90 is disposed at an edge of a length direction of the respective side surfaces 60b, 60c and 60d. In addition, the guide 90 is not disposed at the first side surface 60a facing the light source 83.

More specifically, at the second and third side surfaces 60b and 60c, the guide 90 may be disposed in any position, but is preferably disposed adjacent to the fourth side surface 60d, and at the fourth side surface 60d, the guide 90 is preferably disposed adjacent to the second side surface 60b or the third side surface 60c because the projection 97 is readily deformed by the expansion force and displacement of the light guide plate 60 is prevented.

The guide may be present in plural at the respective side surfaces 60b to 60d, but the present invention is not limited thereto.

Figure 6:
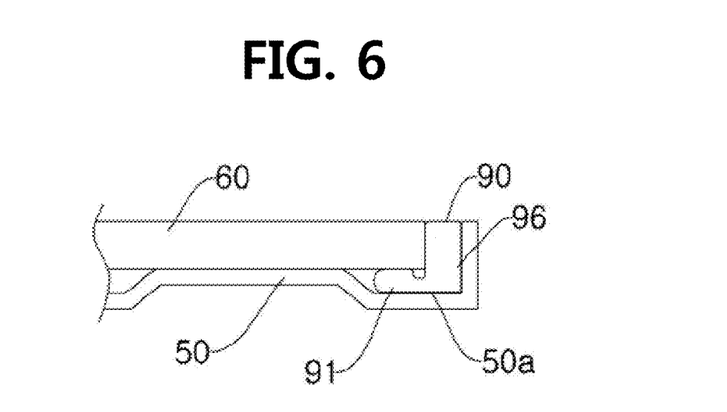
FIG. 6 is an example view illustrating a mounting member formed on the cover bottom.

FIG. 6 is an example view illustrating a mounting member formed on the cover bottom 50.

Referring to FIG. 6, as described above, the guide 90 includes a first support 91 supporting the rear surface of the light guide plate 60. When the guide 90 is bonded to the light guide plate 60, the first support 91 of the guide 90 protrudes from the rear surface of the light guide plate 60. For this reason, the light guide plate 60 is spaced from the bottom surface 51 of the cover bottom 50 and is thus not supported by the cover bottom 50.

For this reason, a part of the cover bottom 50 is shaped in a bent form, and the light guide plate 60 and the cover bottom 50 are spaced from each other at the position corresponding to the side surface of the light guide plate 60. The mounting member 50a is formed to provide a space based on this configuration. The first support 91 of the guide is disposed in the mounting member 50a and the first support 91 closely contacts the bottom surface of the cover bottom 50 provided with the mounting member 50a to support the light guide plate 60.

As apparent from the fore-going, the illustrated embodiment provides a backlight unit and a display device 20 including the same which prevent displacement of the light guide plate 60 by exterior force to firmly fix the light guide plate 60 and to induce deformation upon expansion or contraction of the light guide plate 60 to firmly support the expanded or contracted light guide plate 60.

In addition, the backlight unit 40 according to the illustrated embodiment prevents displacement of the light guide plate 60 by exterior force and allows for deformation by expansion or contraction, thereby preventing damage of the light guide plate 60 and the reflective sheet 61 and deformation of the light guide plate 60 by expansion and contraction.

In addition, the backlight unit 40 according to the illustrated embodiment prevents damage of the light guide plate 60 and the reflective sheet 61 and deformation of the light guide plate, thereby preventing deterioration in display quality which may be caused by the damage.

It will be apparent to those skilled in the art that various modifications and variations can be made in the illustrated embodiments without departing from the spirit or scope of the invention. Thus, it is intended that the present invention covers the modifications and variations of this invention provided they come within the scope of the appended claims and their equivalents.

What is claimed is:

1. A backlight unit comprising:
   a cover bottom;
   a light guide plate on the cover bottom, the light guide plate including a first side, a second side perpendicular to the first side, a third side opposite the second side, and a fourth side opposite the first side;
   a light source between the cover bottom and the first side of the light guide plate; and
   a guide between the cover bottom and the second to fourth sides of the light guide plate, the guide including:
      a first support including a base having a flat bottom surface and a protrusion vertically extending away from the flat bottom surface of the base, the protrusion having a top surface contacting a lower part of the light guide plate;
      a second support vertically extending from an edge of the flat bottom surface of the base of the first support; and
      a plurality of projections protruding from the second support toward the light guide plate and away from the edge of the base, the plurality of projections contacting a lateral surface of the light guide plate and a top surface of the base of the first support,
      wherein the protrusion of the first support is spaced from the plurality of projections, and the top surface of the protrusion of the first support is higher than the top surface of the base of the first support in contact with the plurality of the projections,
   wherein the cover bottom includes:
      a mounting member having a top surface contacting the flat bottom surface of the guide,
      a bent portion extending upward from the mounting member, the bent portion having a top surface contacting the bottom part of the light guide plate, and
      a wall body extending vertically from the mounting member and contacting a lateral side of the second support of the guide, wherein the mounting member and a bottom surface of the light guide plate define a space accommodating the first support of the guide,
   wherein the guide is disposed at the second and third sides adjacent to the fourth side, and at the fourth side is adjacent to the second or the third side, and
   wherein the protrusion and the base of the first support include slanted lateral surface between the top surface of the protrusion and the flat bottom surface of the base.

2. The backlight unit according to claim 1, wherein the guide includes a groove between the protrusion of the first support and ends of the plurality of projections at opposite sides of the second support, the ends of the plurality of projections facing the light guide plate.

3. The backlight unit according to claim 1, wherein the slanted lateral surface forms an angle with respect to a direction along which the projections extend from the second support.

4. A display device comprising:
   a display panel; and
   a backlight unit disposed on a rear surface of the display panel, the backlight unit supplying light to the display panel, the backlight unit comprising:
      a cover bottom;
      a light guide plate on the cover bottom, the light guide plate including a first side, a second side perpendicular to the first side, a third side opposite the second side, and a fourth side opposite the first side;
      a light source between the cover bottom and the first side of the light guide plate; and
      a guide between the cover bottom and the second to fourth sides of the light guide plate, the guide including:
         a first support including a base having a flat bottom surface and a protrusion vertically extending away from the flat bottom surface of the base, the protrusion having a top surface contacting a lower part of the light guide plate;
         a second support vertically extending from an edge of the flat bottom surface of the base of the first support; and
         a plurality of projections protruding from the second support toward the light guide plate and away from the edge of the base, the plurality of projections contacting a lateral surface of the light guide plate and a top surface of the base of the first support,
         wherein the protrusion of the first support is spaced from the plurality of projections, and the top surface of the protrusion of the first support is higher than the top surface of the base of the first support in contact with the plurality of the projections,
      wherein the cover bottom includes:
         a mounting member having a top surface contacting the flat bottom surface of the guide,
         a bent portion extending upward from the mounting member, the bent portion having a top surface contacting the bottom part of the light guide plate, and
         a wall body extending vertically from the mounting member and contacting a lateral side of the second support of the guide, wherein the mounting member and a bottom surface of the light guide plate define a space accommodating the first support of the guide,
      wherein the guide is disposed at the second and third sides adjacent to the fourth side, and at the fourth side adjacent to the second or the third side, and
      wherein the protrusion and the base of the first support include slanted lateral surface between the top surface of the protrusion and the flat bottom surface of the base.

5. The display device according to claim 4, wherein the guide includes a groove between the protrusion of the first support and ends of the plurality of projections at opposite sides of the second support, the ends of the plurality of projections facing the light guide plate.

6. The display device according to claim 4, wherein the slanted lateral surface forms an angle with respect to a direction along which the projections extend from the second support.

* * * * *